United States Patent
Spitzer et al.

(10) Patent No.: US 9,036,058 B2
(45) Date of Patent: May 19, 2015

(54) METHOD AND SYSTEM FOR REDUCING CHROMATIC ABERRATION

(71) Applicant: Ramot at Tel-Aviv University Ltd., Tel-Aviv (IL)

(72) Inventors: Hedva Spitzer, Tel-Aviv (IL); Yuval Barkan, Kfar-Sirkin (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 25 days.

(21) Appl. No.: 13/939,218

(22) Filed: Jul. 11, 2013

(65) Prior Publication Data

US 2014/0015994 A1 Jan. 16, 2014

Related U.S. Application Data

(60) Provisional application No. 61/670,664, filed on Jul. 12, 2012.

(51) Int. Cl.
| | |
|---|---|
| *H04N 5/217* | (2011.01) |
| *G06K 9/36* | (2006.01) |
| *G06T 5/00* | (2006.01) |
| *G06T 5/20* | (2006.01) |
| *H04N 5/357* | (2011.01) |

(52) U.S. Cl.
CPC . *G06K 9/36* (2013.01); *G06T 5/006* (2013.01); *G06T 5/20* (2013.01); *G06T 2207/10024* (2013.01); *H04N 5/3572* (2013.01)

(58) Field of Classification Search
USPC .......................................................... 348/241
See application file for complete search history.

(56) References Cited

U.S. PATENT DOCUMENTS

| | | | |
|---|---|---|---|
| 8,358,835 B2 | 1/2013 | Song et al. | |
| 2008/0007630 A1* | 1/2008 | Hara | 348/223.1 |
| 2009/0263018 A1 | 10/2009 | Murakami et al. | |
| 2012/0281122 A1* | 11/2012 | Kang et al. | 348/242 |

OTHER PUBLICATIONS

Efi Arazi School "2010 Israel Computer Vision Day", The Efi Arazi School of Computer Science, IDC Herzliya, 10 P., Dec. 5, 2010.

* cited by examiner

Primary Examiner — Anthony J Daniels

(57) ABSTRACT

A method of processing a polychromatic image is disclosed. The method comprises, for each of at least a portion of the picture elements, assigning to the picture element a new color value for each individual color, and storing the new values in a computer readable medium. The new values are assigned by: processing each of a first and a second colors of the picture element, based, at least in part on first and second colors of peripheral picture elements, to respectively provide a first processed color value and a second processed color value; employing optimization for reducing error and for assigning to the picture element a new color value for each of the first and second colors; and assigning to the picture element a new color value for a third color calculated based, at least in part, on the new color values for the first and second colors.

32 Claims, 11 Drawing Sheets
(7 of 11 Drawing Sheet(s) Filed in Color)

FIG. 3A
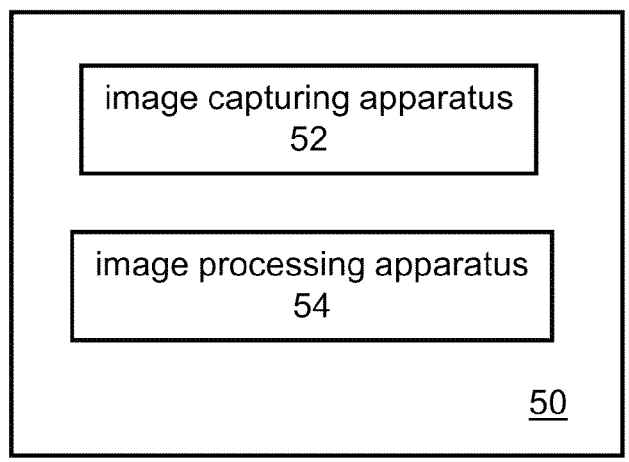
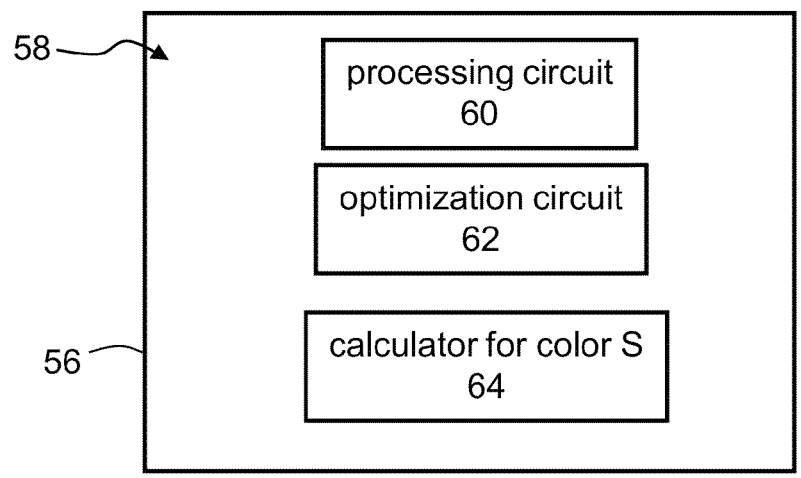
FIG. 3B

FIG. 9A
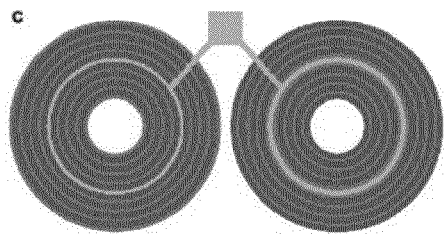
FIG. 9B
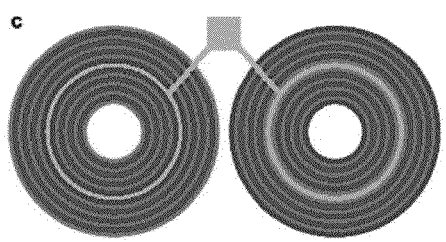
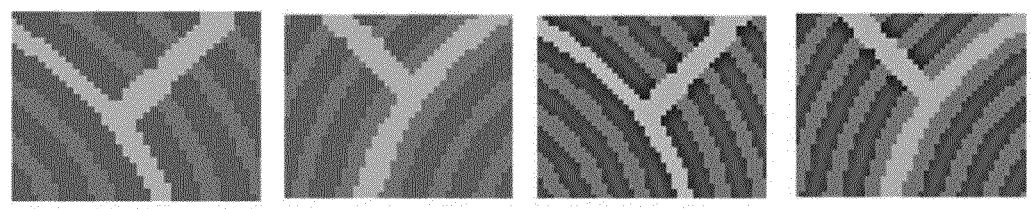
FIG. 9C

METHOD AND SYSTEM FOR REDUCING CHROMATIC ABERRATION

RELATED APPLICATION

This application claims the benefit of priority under 35 U.S.C §119(e) of U.S. Provisional Patent Application No. 61/670,664 filed Jul. 12, 2012, the contents of which are incorporated herein by reference in their entirety.

FIELD AND BACKGROUND OF THE INVENTION

The present invention, in some embodiments thereof, relates to image processing and, more particularly, but not exclusively, to a method and a system for reducing chromatic aberration.

Imaging systems employ optical elements such as lenses or lens assemblies that focus incoming light onto a light sensor element. Lenses and lens assemblies oftentimes have aberrations which can degrade the quality of images captured by such the imaging system. One type of aberration is chromatic aberration which results from the fact that different wavelengths or colors of light are refracted by different amounts by the lens or lens assembly.

Chromatic aberration appears when a lens is transmitting polychromatic light. Since the index of refraction of optical glass is wavelength dependent, the red, green and blue components bend differently at an optical interface in the lens. This leads to longitudinal (axial) and/or transverse chromatic aberration effects. When a lens fails to focus various colors sharply in the same plane, the lens is said to exhibit longitudinal chromatic aberration (LCA).

In longitudinal chromatic aberration, the three components are brought to focus on different planes in the image space, which gives a color blurring effect. Thus, longitudinal chromatic aberration arises due to the focal length varying with wavelength.

In transverse chromatic aberration, color components from a single point are brought to focus to different points on the same image plane, resulting in a lateral shift of the image. This has the effect of magnifying the different wavelength differently and can be visually seen as color fringing. Thus, transverse chromatic aberration can be seen as an effect due to magnification varying with wavelength.

Chromatic aberrations are channel dependent in the sense that each color channel, e.g., red, green and blue channels, provides a different amount of the aberration artifact in the image plane. In order to characterize these aberrations, the ability of a lens to transfer information from the object to an image plane is represented as a modulation transfer function (MTF). A lens MTF is a measure of how well the original frequency-dependent contrast of the object is transferred to the image.

Because the distortion introduced by aberrations into an optical system significantly degrades the quality of the images on the image plane of such system, there are advantages to the reduction of those aberrations. A great deal of the complexity of modern lenses is due to efforts on the part of optical designers to reduce optical aberrations. An alternative approach is to compensate for these aberrations in the reproduction process so that final images with reduced aberrations may be obtained.

U.S. Application Publication No. 20090263018 discloses an image processing apparatus that reduces color blur included in an image which is constituted by plural color planes. The apparatus reduces a component of chromatic aberration of magnification which is included in the image, and a component of longitudinal chromatic aberration which is included in the image after the component of chromatic aberration of magnification has been reduced. The component of longitudinal chromatic aberration is calculated based on a distance from a brightness saturation area in the image.

U.S. Pat. No. 8,358,835 discloses a technique for detecting and correcting a chromatic aberration. A chromatic aberration is detected by (i) dividing an edge portion of the image into static areas where a color varies below a reference value and a dynamic area where a color varies above the reference value, (ii) calculating a intensity difference value between a reference color and a comparative color for each of the static areas and the dynamic area, and (iii) determining a chromatic aberration region when an intensity difference value exceeds a range of intensity difference values in the static areas among pixels in the dynamic area. The chromatic aberration is corrected by correcting the intensity difference value for the pixels in the chromatic aberration region using a correction value in the intensity difference value range in the static area.

SUMMARY OF THE INVENTION

According to an aspect of some embodiments of the present invention there is provided a method of processing a polychromatic image arranged gridwise in a plurality of picture elements each represented by a color spectrum resolvable into a plurality of individual colors over the grid. The method comprises, for each of at least a portion of the picture elements, using an image processor for assigning to the picture element a new color value for each individual color, and storing the new values in a computer readable medium. In some embodiments of the present invention the new values are assigned by: processing each of a first and a second colors of the picture element, based, at least in part on first and second colors of picture elements being peripheral to the picture element, to respectively provide a first processed color value and a second processed color value; employing an optimization procedure for reducing an error of the processed color values, and for assigning to the picture element a new color value for each of the first and the second colors; and assigning to the picture element a new color value for a third color calculated based, at least in part, on the new color values for the first and the second colors.

According to some embodiments of the invention the processing comprises: obtaining a first central value and a second central value, respectfully corresponding to the first and the second colors; calculating a first peripheral value and a second peripheral value, respectfully corresponding to the first and the second colors; subtracting the second peripheral value from the first central value, thereby providing the first processed value; and subtracting the first peripheral value from the second central value, thereby providing the second processed value.

According to some embodiments of the invention the method further comprising calculating the first central value and the second central values, by integrating respective color values over picture-elements other than the peripheral picture-element and being nearby the picture-element.

According to some embodiments of the invention the calculation of the third color further comprises: obtaining a third central value corresponding to the third color; subtracting from the third central value an average between the first central value and the second central value.

According to some embodiments of the invention the image is a still image.

According to some embodiments of the invention the image is a frame of a video stream, and the method is repeated for each frame of the video stream.

According to an aspect of some embodiments of the present invention there is provided apparatus for processing a polychromatic image arranged gridwise in a plurality of picture elements each represented by a color spectrum resolvable into a plurality of individual colors over the grid. The apparatus comprises, an image processor configured for assigning to the picture element a new color value for each individual color, and storing the new values in a computer readable medium. In some embodiments of the present invention the image processor comprises a circuit configured for: processing each of a first and a second colors of the picture element, based, at least in part on first and second colors of picture elements being peripheral to the picture element, to respectively provide a first processed color value and a second processed color value; employing an optimization procedure for reducing an error of the processed color values, and for assigning to the picture element a new color value for each of the first and the second colors; and assigning to the picture element a new color value for a third color calculated based, at least in part, on the new color values for the first and the second colors.

According to some embodiments of the invention the circuit is configured for: obtaining a first central value and a second central value, respectfully corresponding to the first and the second colors; calculating a first peripheral value and a second peripheral value, respectfully corresponding to the first and the second colors; subtracting the second peripheral value from the first central value, thereby providing the first processed value; and subtracting the first peripheral value from the second central value, thereby providing the second processed value.

According to some embodiments of the invention the first central value and the second central values are respective color values of the picture-element.

According to some embodiments of the invention the circuit is configured for calculating the first central value and the second central values, by integrating respective color values over picture-elements other than the peripheral picture-element and being nearby the picture-element.

According to some embodiments of the invention the optimization procedure comprises a gradient descend procedure.

According to some embodiments of the invention the optimization procedure comprises at least one procedure selected from the group consisting of implex, convex minimization, neural networks, Bayesian networks, support vector machine, linear programming, nonlinear programming, Hessian procedure, entropy optimization, and simulated annealing.

According to some embodiments of the invention the new color value for the third color is calculated using an average of the new color for the first color and the new color for the second color.

According to some embodiments of the invention the circuit is configured for: obtaining a third central value corresponding to the third color; subtracting from the third central value an average between the first central value and the second central value.

According to an aspect of some embodiments of the present invention there is provided a camera system, comprising an image capturing apparatus for capturing a polychromatic image, and an apparatus for processing the polychromatic image. The apparatus for processing the polychromatic image can comprises the apparatus as described above and optionally as exemplified below.

According to some embodiments of the invention the circuit of the apparatus for processing the polychromatic image is an integrated circuit mounted within the body of the image capturing apparatus.

According to an aspect of some embodiments of the present invention there is provided a cellular telephone, which comprises the camera system as described above and optionally as exemplified below.

According to an aspect of some embodiments of the present invention there is provided a tablet device, which comprises the camera system as described above and optionally as exemplified below.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram of a method for processing an image, according to some embodiments of the present invention;

Figures 2A, 2B:
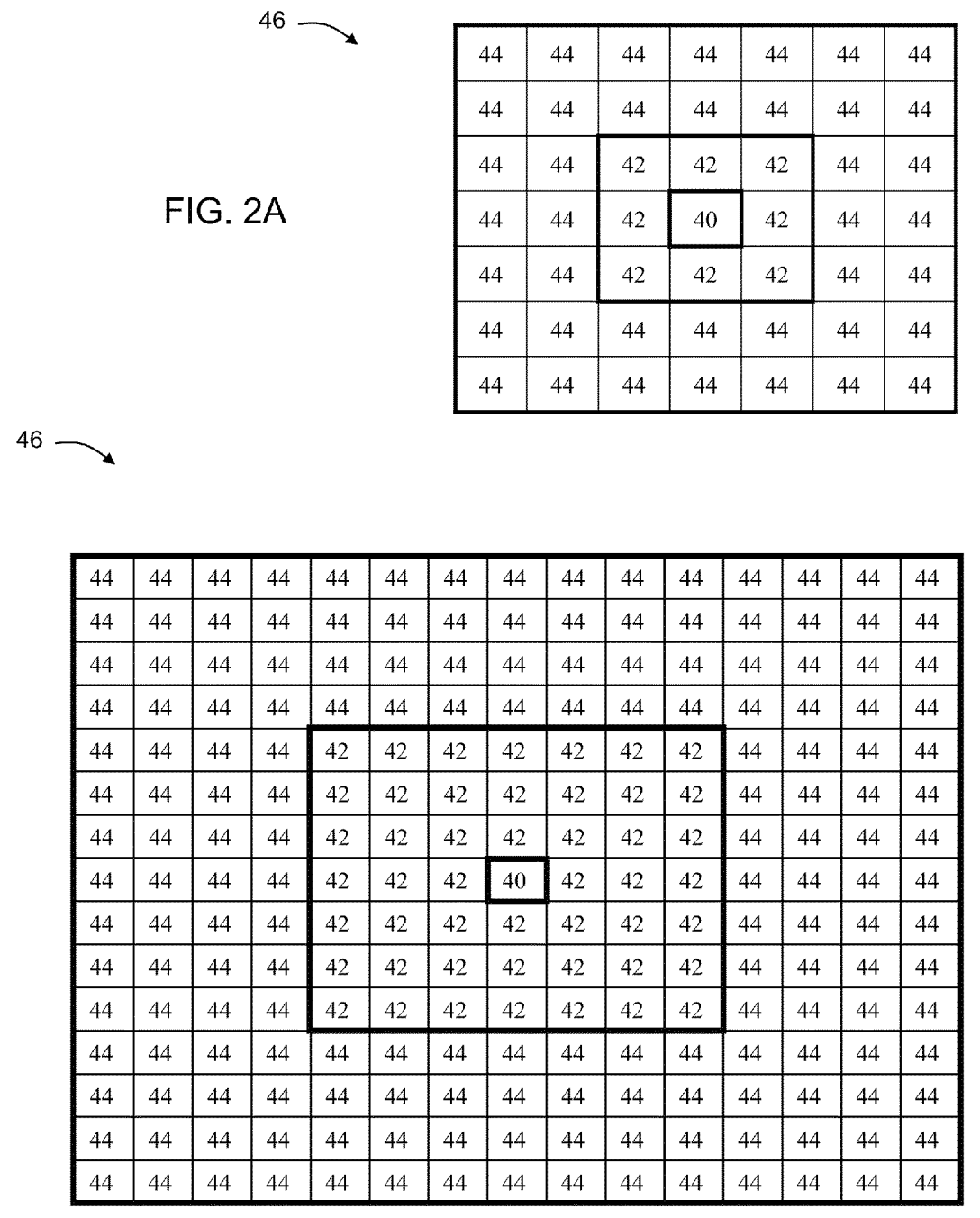
Figure 4A:
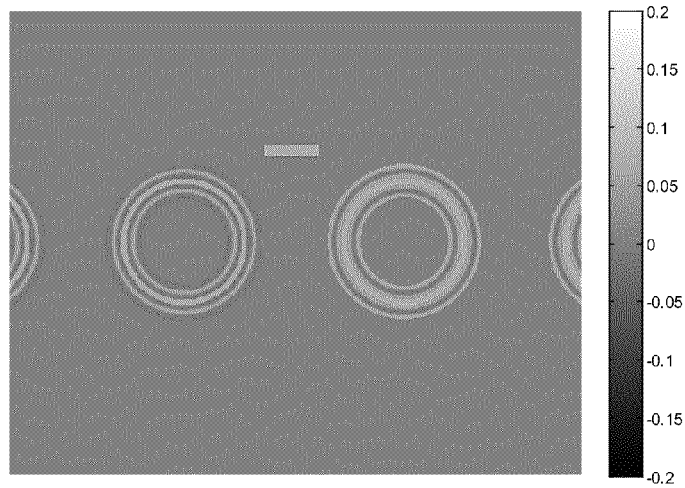
Figure 4B:
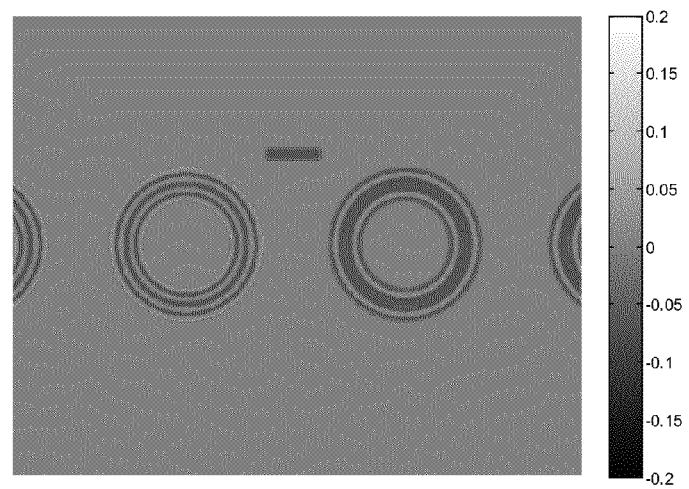
Figure 4C:
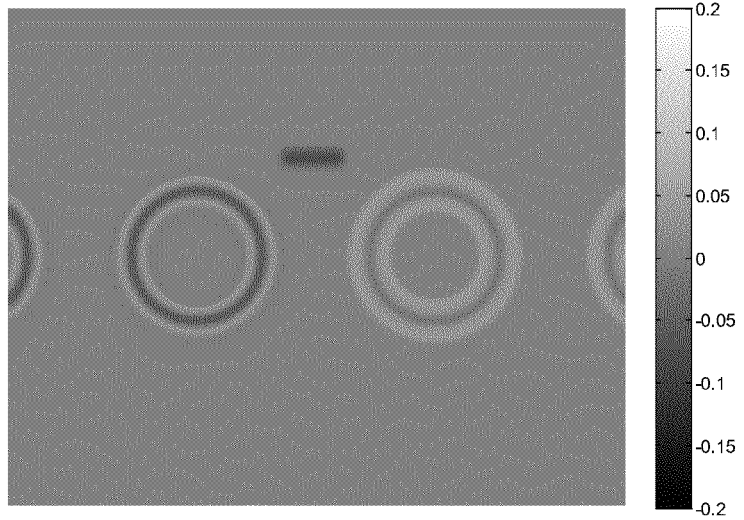
Figure 5A:
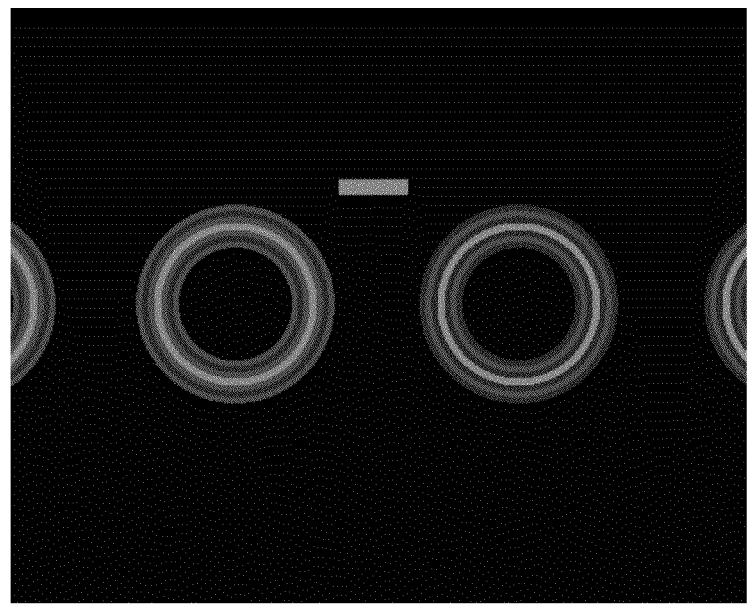
Figure 5B:
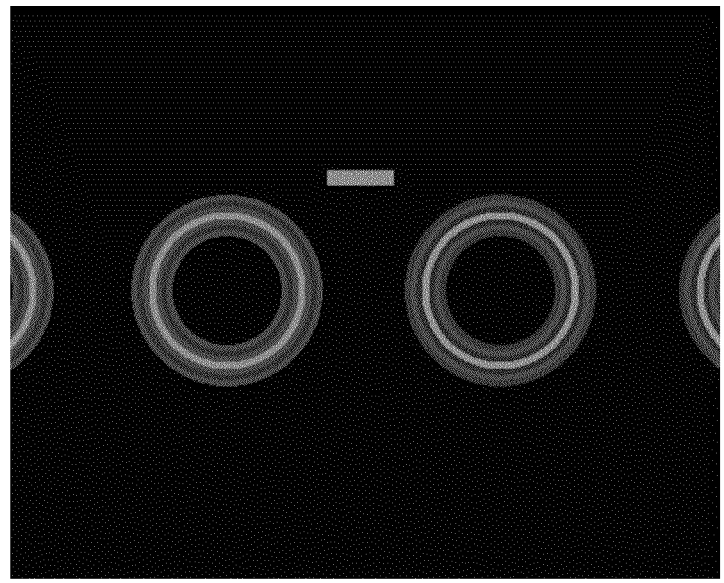
Figure 5C:
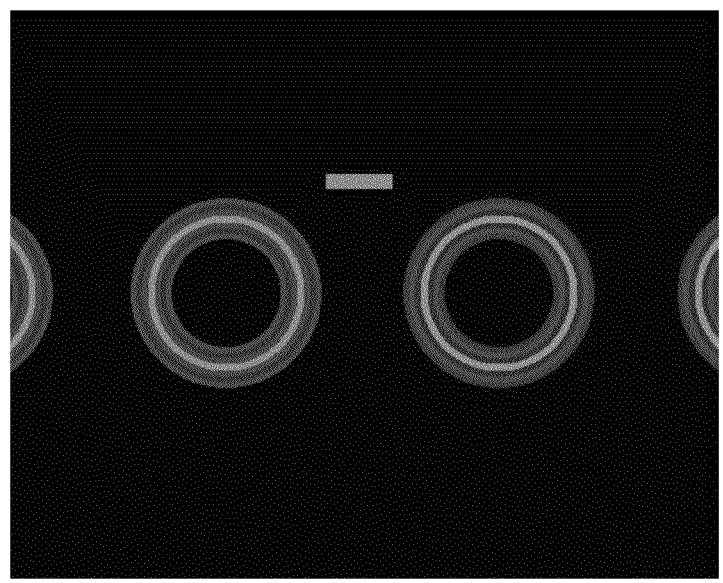
Figure 7A:
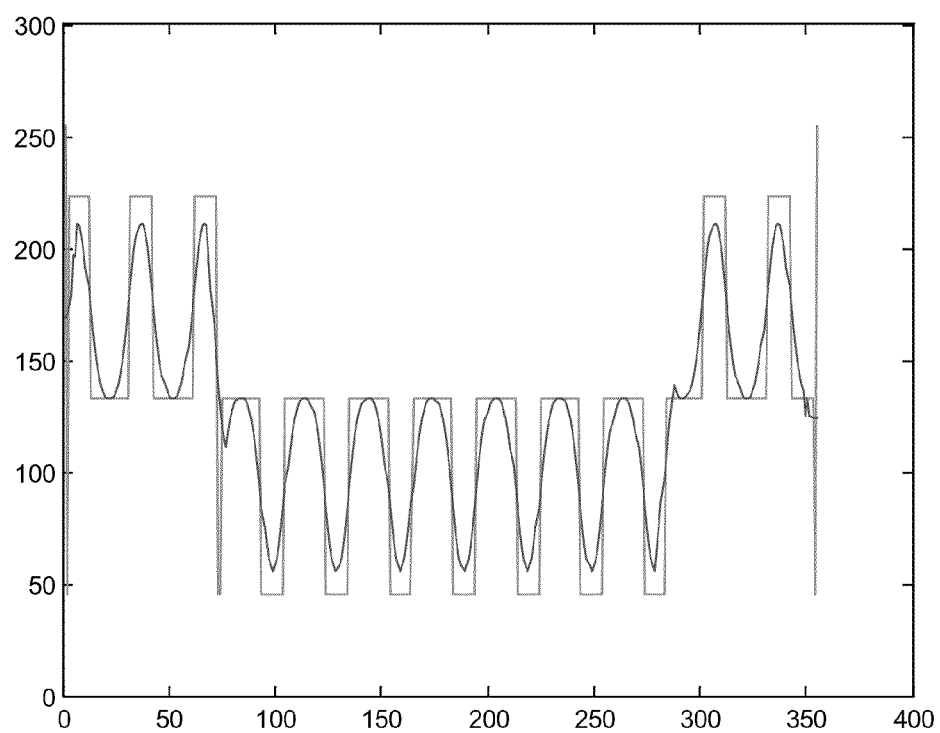
Figure 7B:
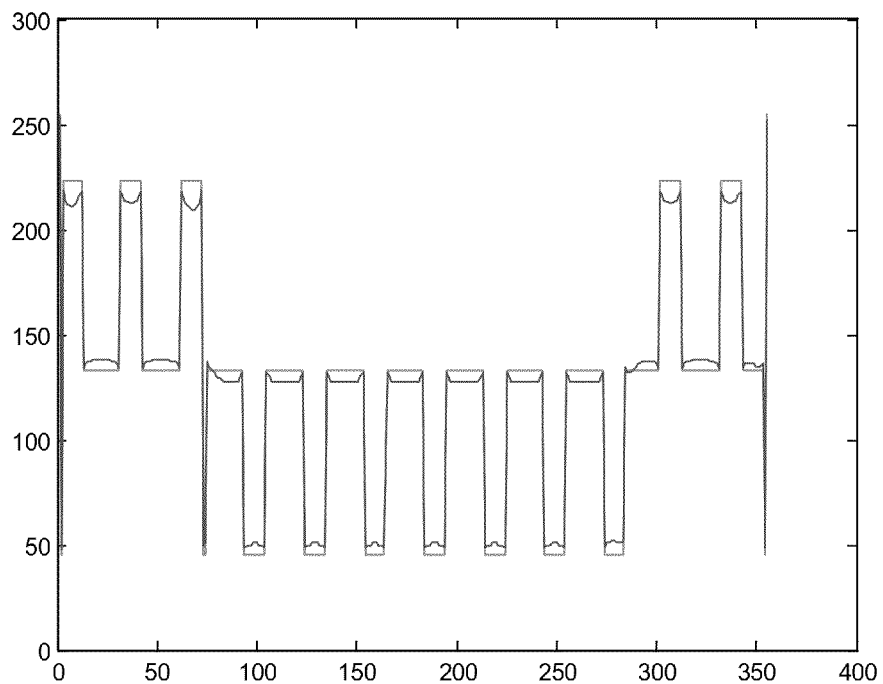
Figure 7C:
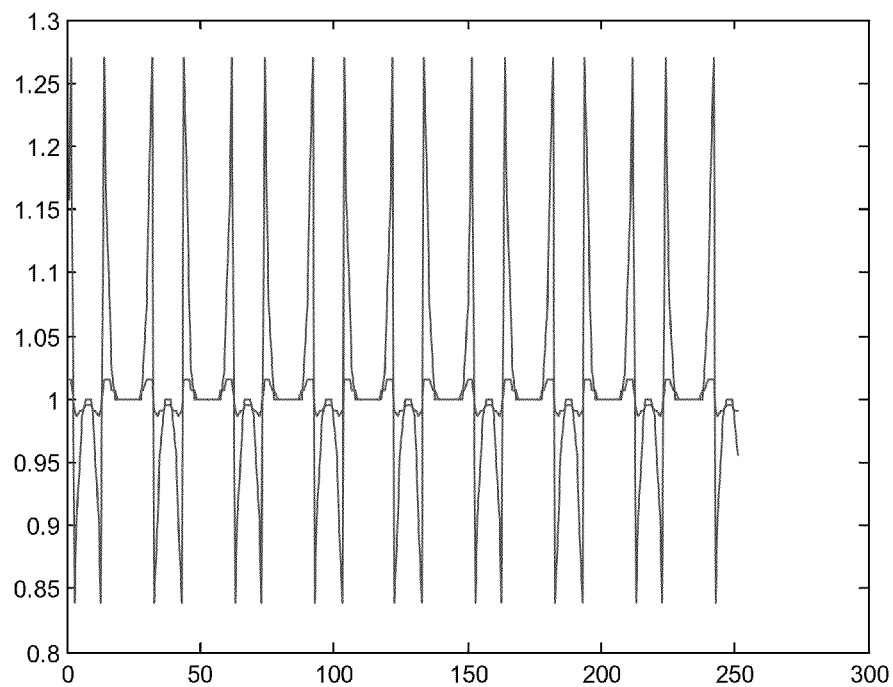
Figure 8A:
Figure 8B:
Figure 8C:
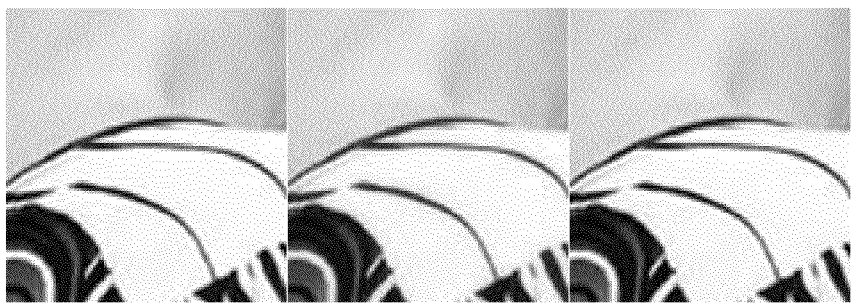

FIGS. 2A-B are a schematic illustration showing several regions of picture-elements, according to some embodiments of the present invention;

FIGS. 3A-B are schematic illustrations of a camera system, according to some embodiments of the present invention;

FIGS. 4A-C show model response of three different color coding receptive fields, as obtained in computer simulations performed according to some embodiments of the present invention;

FIGS. 5A-C show stages during an iterative process that computes the perceived values, according to some embodiments of the present invention;

FIGS. 6A-F demonstrate the performance of the technique of the present embodiments when applied on an artificial synthetic achromatic grid;

FIGS. 7A-C show plots that describe chromatic compensation achieved during computer simulations performed according to some embodiments of the present invention;

FIGS. 8A-C demonstrate the performance of the technique of the present embodiments when applied to an image captured from a scene; and FIGS. 9A-C show effect of chromatic illusion, obtained during computer simulations performed according to some embodiments of the present invention.

DESCRIPTION OF SPECIFIC EMBODIMENTS OF THE INVENTION

The present invention, in some embodiments thereof, relates to image processing and, more particularly, but not exclusively, to a method and a system for reducing chromatic aberration.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments are concerned with method and system for processing an image to facilitate its display. The method and system of the present embodiments are particularly useful for reducing chromatic aberration, such as longitudinal chromatic aberration. At least part of the processing can be implemented by a data processing system, e.g., a dedicated circuitry or a general purpose computer, configured for receiving the image and executing the operations described below.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Computer programs implementing the method of the present embodiments can commonly be distributed to users on a distribution medium such as, but not limited to, a floppy disk, a CD-ROM, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The image to be analyzed using the teachings of the present embodiments is generally in the form of imagery data arranged gridwise in a plurality of picture-elements (e.g., pixels, group of pixels, etc.).

The term "pixel" is sometimes abbreviated herein to indicate a picture-element. However, this is not intended to limit the meaning of the term "picture-element" which refers to a unit of the composition of an image.

References to an "image" herein are, inter alia, references to values at picture-elements treated collectively as an array. Thus, the term "image" as used herein also encompasses a mathematical object which does not necessarily correspond to a physical object. The original and processed images certainly do correspond to physical objects which are the scene from which the imaging data are acquired.

In various exemplary embodiments of the invention the image is a polychromatic image. In these embodiments, each picture-element in the image is represented by a color spectrum resolvable into a plurality (e.g., three or more) of individual colors over a grid. The individual colors are typically in the form of digital intensity values sampling the amount of light at a plurality of color channels. Also contemplated are images in which each pixel is associated with a mantissa for each color channel and a common exponent (e.g., the so-called RGBE format). Such images are known as "high dynamic range" images.

The individual colors that define the spectrum of a given picture-element of the image are referred to below as a first color L, a second color M and a third color S. In various exemplary embodiments of the invention the notations "L," "M," and "S" refer to "Long," "Medium" and "Short," so that first color L has the longest wavelength of the three individual colors, the second color M has the next to longest wavelength the three individual colors, and the third color S has the shortest wavelength of the three individual colors. For example, color L can be a red or reddish color, color M can be a green or greenish color, and color S can be a blue or bluish color. It is to be understood, however, that while in some embodiments of the present invention the individual colors over the image are a red color, a green color and a blue color, it is not intended to limit the scope of the present invention to exclusive processing of these individual colors.

In some embodiments, the colors L, M and S represent peaks of characteristic absorption spectra of photoreceptor cells in the human retina. In these embodiments, the L color correspond to the peak of the characteristic absorption spectrum of the L cone cells, the M color correspond to the peak of the characteristic absorption spectrum of the M cone cells, and the S color correspond to the peak of the characteristic absorption spectrum of the S cone cells. Representative examples for wavelengths associated with the colors including, without limitation, from about 564 nm to about 580 nm for first color L, from about 534 nm to about 545 nm for second color M, and from about 420 nm to about 440 nm for third color S. Other wavelengths are not excluded from the scope of the present invention.

The input image can be provided by any imaging modality, including, without limitation, a digital camera, a video camera, a CMOS digital camera, an endoscopic imaging device, a radio telescope, a digital telescope, a digital microscope and a system for translating an analog image to a digital image.

Figure 1:
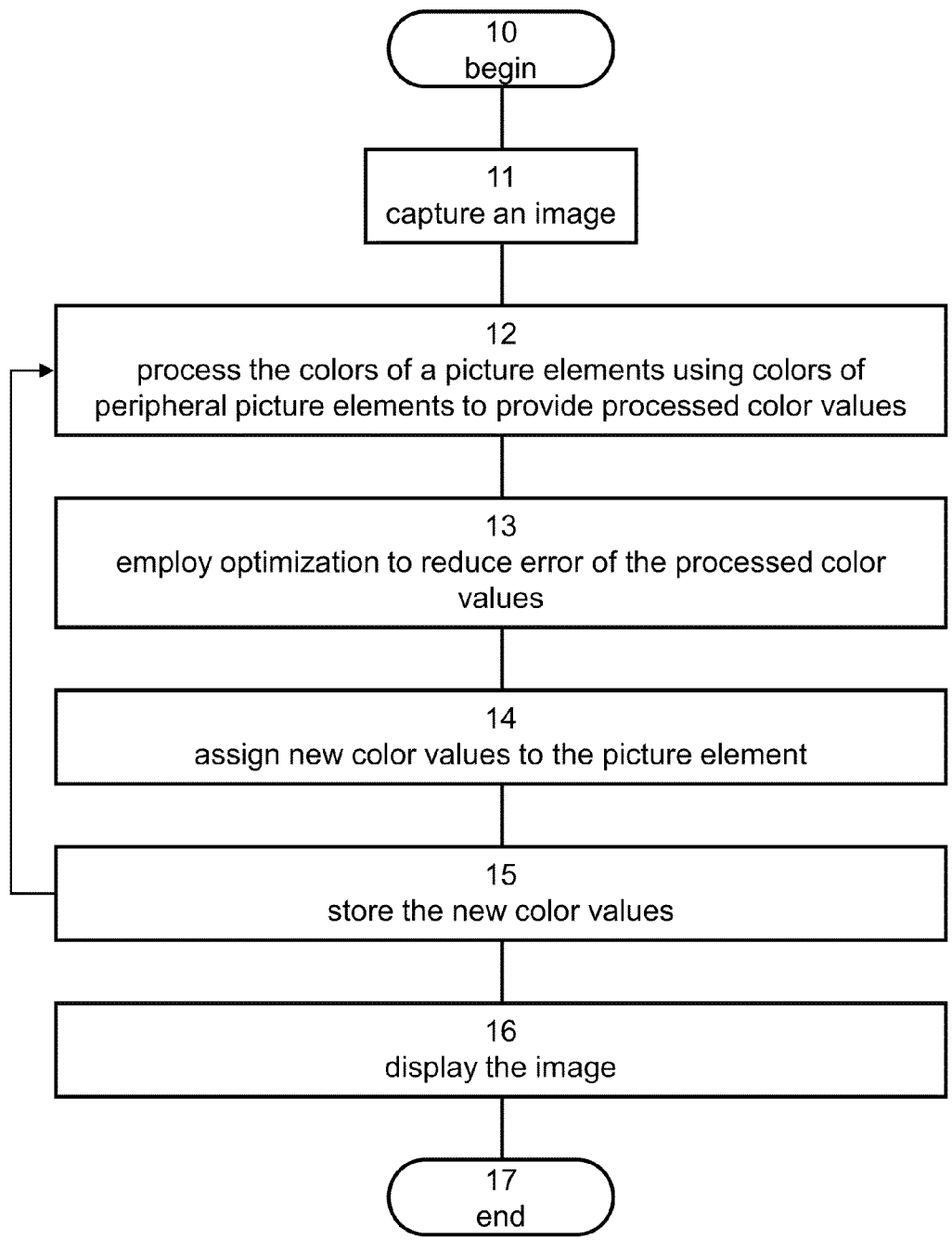

FIG. 1 is a flowchart diagram of the method according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally continues to 11 at an image of a scene is captured. The image can be captured using any imaging technique known in the art, preferably, but not necessarily, visible light imaging. The imaged scene can be of any type, including, without limitation, an outdoor scene, an indoor scene, a nearby scene, a remote scene, an astronomical scene, an underwater scene, an intracorporeal scene (namely a scene that includes internal organs of a subject), an extracorporeal scene (namely a scene that includes external organs of a subject), and any combination thereof.

In some embodiments of the present invention the method captures a video stream which may include a plurality of time-dependent values (e.g., color intensities, etc.), wherein a particular value at a particular time-point corresponds to a picture-element (e.g., a pixel, a sub-pixel or a group of pixels) in a video frame.

Alternatively, 11 can be skipped in which case an image is received as imaging data.

In what follows, the description of the method is directed to the processing of the individual colors of an arbitrarily chosen picture element, generally referred to herein as element 40 (not shown in FIG. 1, see FIGS. 2A-B). It is to be understood that the method operations can be repeated independently for most or all the picture-elements of the digital image. The picture-element can be a pixel or a collection of pixels.

The method continues to 12 at which each of the first color and the second color of picture element 40 are processed, based, at least in part on the first and second colors of picture elements being peripheral to picture element 40.

The concept of peripheral picture-elements may be better understood from the following example, with reference to FIGS. 2A-B. FIGS. 2A-B illustrate a portion of rectangular grid 46 including picture-element 40 and peripheral picture-elements 42 and 44 that are at various proximity levels to picture-element 40.

The present embodiments contemplate an image processing in which three regions of picture-elements are defined for picture-element 40. A central region of picture-element may be a single picture element (element 40), a surround region of picture-element may be picture elements 42 surrounding picture elements 40 and a remote region of the present invention may be picture elements 44, surrounding picture elements 42.

In FIG. 2A, the surround region comprises eight picture-elements immediately surrounding (i.e., adjacent to) element 40, and the remote region comprises 40 picture-element forming the two layers surrounding those eight picture-elements. However, this need not necessarily be the case, since, for some applications, it may be desired to extend the surround region farther from those eight elements which immediately surround element 40. FIG. 2B, for example, illustrates an embodiment in which the surround region comprises 48 picture-element which form the first three layers surrounding element 40, and the remote region comprises 176 picture-element which form the four layers surrounding those 48 elements. Also contemplated are embodiments in which the center region comprises more picture-element, e.g., an arrangement of 2×2 or 3×3 picture-elements that includes picture-element 40. Other definitions for the center, surrounding and remote regions are not excluded from the present invention, both for a rectangular grid or for any other arrangement according to which the picture elements of the image are inputted.

The color values associated with element 40 are referred to herein as central color values, and the color values associated with elements 42 and 44 are referred to as peripheral color values.

In various exemplary embodiments of the invention processing 12 includes the calculation of a peripheral value for each of the first and second colors, using the respective color values of the picture-elements 42 that occupy the surround region, and subtracting one of these peripheral values from each of the central values that correspond to the first and second color values. In various exemplary embodiments of the invention the peripheral value corresponding to color M is subtracted from the central value that corresponds to color L, and the peripheral value corresponding to color L is subtracted from the central value that corresponds to color M.

Processing 12 provides two processed color values for element 40. These processed color values are referred to herein as a first processed color value $L^+M^-$, and a second processed color value $M^+L^-$. $L^+M^-$ and $M^+L^-$ can be written as:

$$L^+M^-(x,y) = L^+M^-_{cen}(x,y) - L^+M^-_{sur}(x,y)$$

$$M^+L^-(x,y) = M^+L^-_{cen}(x,y) - M^+L^-_{sur}(x,y) \quad \text{(EQ. 1)}$$

where the set of tuples (x, y) represents the picture-elements in the image, $L^+M^-_{cen}$ denotes the central value corresponding to color L, $M^+L^-_{cen}$ denotes the central value corresponding to color M, $L^+M^-_{sur}$ denotes the peripheral value corresponding to color M, and $M^+L^-_{sur}$ denotes the peripheral value corresponding to color L.

According to some embodiments of the present invention the central and peripheral values are calculated using a regional spatial profile, $f_r$, where r is a regional subscript that should be understood as denoting the center, surround or remote region. More preferably, the central and peripheral values are calculated as an inner product of the color values of the picture elements in each region with the respective regional spatial profile. Mathematically this inner product is realized by the integral $\int X f_r ds$, where X represent a color (L or M) and ds is an area integration measure. The measure ds is selected in accordance with the arrangement of the inputted picture elements, e.g., for a rectangular x-y grid-like arrangement ds equals dx dy. The area of integration depends on the regional subscript, r. Specifically, for the central values $L^+M^-_{cen}$ and $M^+L^-_{cen}$ the integration area typically extends over the center region (which may, in some embodiments, include only element 40), and for the peripheral value the integration area typically extends over the picture elements 42 of the surround region. In some embodiments of the present invention the method also calculates the integral $\int X f_r ds$ for each color X associated with the picture-element 44 that occupy the remoter region. The results of these calculations are referred to as remote values, and are denoted $L_{remote}$, $M_{remote}$ and $S_{remote}$.

The regional spatial profiles, $f_r$, used for calculating the central, peripheral and optionally also the remote values are preferably spatial decaying functions, with may have different forms, depending on the region in which the profiles are applied. Examples for the specific form of each regional spatial profile include, but are not limited to, a Gaussian, an exponent, a Lorenzian, a modified Bessel function and a power-decaying function.

As a representative example, in embodiments in which Gaussian profiles are employed, $f_r$ can have the form $f_r(x,y)=(1/\pi\rho_r)\exp[-(x^2+y^2)/\rho^2]$, where $\rho_r$ is a radius defining the respective region. In various exemplary embodiments of the invention $f_r(x,y)$ is set to zero anywhere outside the respective region. Specifically, for the center region $f_r$ equals zero anywhere outside the center region, for the surround region $f_r$ equals zero anywhere outside the surround region, and for the remote region $f_r$ equals zero anywhere outside the remote region.

The remote values defined above are optionally and preferably used for applying an adaptation procedure to the color values prior to the calculation of the central and peripheral values. This can be done, for example, by employing one or more of the adaptation procedures described in U.S. Pat. No. 6,931,152, and International Publication Nos. WO2004/075535, WO2009/081394, WO2011/045784, WO2011/083480 and WO2012/017440, the contents of which are hereby incorporated by reference.

An adaptation procedure suitable for the present embodiments features saturation functions of the color values. A saturation function for color X according to some embodiments of the present invention can have the form $X/(X+\sigma_x)$, where $\sigma_x$ is an adaptation function for color X (X=L, M, S). In various exemplary embodiments of the invention $\sigma_x$ has a local term and a nonlocal term. This can be mathematically expressed as $\sigma_x=aX+b+cX_{remote}$, where a and b are the coefficients of the local parts of the adaptation functions, and c is a coefficient for the remote part. The coefficients a, b and c may be either constant or variables. Preferably, the value of these coefficients may be chosen in accordance with the dynamic range of the image which is inputted.

The method optionally and preferably continues to 13 at which an optimization procedure is employed for reducing an error of the processed color values, $L^+M^-$ and $M^+L^-$. Any optimization procedure can be employed. Representative examples including, without limitation, gradient descent, implex, convex minimization, neural networks, Bayesian networks, support vector machine, linear programming, nonlinear programming, Hessian procedure, entropy optimization, and simulated annealing. In experiments performed by the present inventors, a gradient descent procedure was employed.

The criterion for the optimization procedure is typically described in terms of a goal function having an extremum that correlates with a minimum of the error of the processed color values. A representative example of such function is:

$$E(L_{new},M_{new})=(L_{new}-(L^+M^-+M_{sur}))^2+(M_{new}-(M^+L^-+L_{sur}))^2 \quad (EQ.\ 2)$$

where, $L_{new}$ and $M_{new}$ are new color values for element 40, which new color values correspond to colors L and M, respectively, and $L_{sur}$ and $M_{sur}$ are calculated based on the colors values that correspond to colors L and M and that are associated with the picture-element 42 of the surround region.

Representative examples for expressions suitable for calculating $L_{sur}$ and $M_{sur}$ are, without limitation:

$$L_{sur}(x,y)=\iint M(x',y')f_s(x-x',y-y')dx'dy';\ \text{and}$$

$$M_{sur}(x,y)=\iint L(x',y')f_s(x-x',y-y')dx'dy' \quad (EQ.\ 3)$$

where $f_s$ is a profile function for the surround region as further detailed hereinabove.

The optimization typically, but not necessarily, includes an iterative process, where in each iteration step, the values of $L_{new}$ and $M_{new}$ are updated and the goal function (e.g., the function E) is evaluated. When the value of the goal function satisfies a predetermined criterion, the iterative process is ceased, and the most updated values of stopping criterion $L_{new}$ and $M_{new}$ are selected as the new colors values of element 40.

Once the new values $L_{new}$ and $M_{new}$ are set, the method optionally and preferably calculates a new color value $S_{new}$ for the third color S based, at least in part on $L_{new}$ and $M_{new}$. In various exemplary embodiments of the invention $S_{new}$ is calculated using an average of $L_{new}$ and $M_{new}$. Preferably, but not necessarily $S_{new}$ is further calculated by subtracting from a central value corresponding to color S an average between the central values corresponding to the colors L and M.

A representative example of an expression suitable for the calculation of $S_{new}$ is, without limitation:

$$S_{new}=S^+(L+M)^-+(L_{new}+M_{new})/2 \quad (EQ.\ 4)$$

where $S^+(L+M)^-$ is a processed value of the third color S. $S^+(L+M)^-$ can be calculated in a way that is similar to the calculation of the processed values for the first color L and the second color M (see EQ. 1), except that instead of subtracting one color from the central value of S, the average of two colors is subtracted. This operation can be formally written as:

$$S^+(L+M)^-(x,y)=\iint(S(x',y')-0.5(L(x',y')+M(x',y')))f_{s\_center}(x-x',y-y')dx'dy'. \quad (EQ.\ 5)$$

where $f_{s\_center}$ is a profile function of a region that encompasses both the center and the surround regions. In some embodiments of the present invention an adaptation procedure as further detailed hereinabove is applied to the colors S, L and M before the calculation of $S^+(L+M)^-$ according to claim 5.

At 14 the new color values $L_{new}$, $M_{new}$ and $S_{new}$ are assigned to picture-element 40. The method optionally and preferably proceeds to 15 at which the new values are stored in a computer readable medium, such as, but not limited to, the computer memory or a more permanent medium such as a hard disk, a flash memory card or the like. The method can be loops back to 12 and the operations 12-14 are repeated for another picture-element. The loops continues until each of at least a portion of the picture-elements (e.g., all the picture-elements) are processed. From the computer readable medium, the processed image that includes a new color value for each processed picture-element can be displayed 16 on a display device.

The method ends at 17.

Reference is now made to FIGS. 3A-B which are schematic illustrations of a camera system 50, according to some embodiments of the present invention. Camera system 50 comprises an image capturing apparatus 52 for capturing a polychromatic image of a scene, and an apparatus 54 for processing the polychromatic image. Apparatus 54 preferably comprises an image processor 56 (e.g., a digital image processing chip) having circuitry 58 configured for performing the method operations described above. Circuitry 58 can comprise, for example, a processing circuit 60 that processes each of a first L and a second M colors of a picture element, based, at least in part on first L and second M colors of picture elements being peripheral to the picture element, as further detailed hereinabove. In some embodiments of the present invention processing circuit 60 also calculates a processed value for the third color S (e.g., according to EQ. 5). Circuitry 58 can also comprise an optimization circuit 62 configured for reducing an error of the processed color values, as further detailed hereinabove. Circuitry 58 can also comprise a third color calculator 64 for calculating a new color value for the third color S, as further detailed hereinabove. Circuitry 58 assigns the new values for each picture element in the image, and stores the new values in a computer readable medium.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The human eye is affected by imperfections of its optics, which degrades the quality of the retinal image and ultimately limits the spatial vision. These imperfections have both spatial and chromatic implications. One of the most dominant chromatic implications is the phenomenon of longitudinal chromatic aberration. The longitudinal chromatic aberration (LCA) is a significant and dominant attribute of the visual system and has been studied and measured extensively.

The LCA is induced by the dependence of the refractive power of the lens with wavelength. The ocular refractive power is higher for shorter wavelengths. The LCA has been measured extensively, both psychophysically, and by using retinoscopic methods. These studies showed that the LCA has a refractive power of about two diopters (D) across the visible spectrum. The Modulation Transfer Function (MTF), of the s-cone channel has a lower frequency cutoff (by a factor of 3-5) than the MTF of the M/L cone channels, due to the LCA.

The present inventors discovered a mechanism that maintains the perceived visual appearance sharp and clear, rather than distorted and chromatically blurred, although the imperfections of the ocular optics, including of the LCA.

Few studies suggested that optical or neuronal mechanism may compensate the LCA. It has been suggested that the 'short wavelength absorbing pigments' of the ocular media play an important role in limiting the chromatic aberration. However, the effect of spectral filtering in the ocular media on the MTF is relatively small. The perceived image, therefore, is still expected to be degraded by the chromatic aberration.

Several studies suggested that there must be a neural compensation for the eye's chromatic aberrations. Such compensatory mechanisms were suggested to be related to the McCollough effect. The logic to account the role of McCollough effect in the LCA phenomenon, is mainly due to its long-lasting temporal property and its relation to chromatic edges. These compensatory models are built from oriented receptive fields (multiplexed simple cell) which are consisted of both chromatic and achromatic separated subunits. The elimination of the chromatic distortion is obtained by a learning mechanism which inhibits the appearance of chromatic edges adjacently to achromatic edges. Until now, evidence for such mechanisms and receptive fields have not been found. The LCA is expected to be expressed not only adjacently to achromatic edges, but also in many other spatial and chromatic configurations, such as in iso-luminance chromatic edges and non-oriented edges (such as textures of dots on uniform background). In such configurations, the "leakage" of short-wavelength colors is still expected to influence the chromatic appearance, and the above models cannot be accounted for their chromatic compensation.

A direct neural mechanism that compensate for general LCA phenomena is still unknown. The present inventors developed a retinal plausible computational technique, for neural-integrating mechanism that can compensate for LCA. In some embodiments of the present invention the technique is based on common retinal color-coding receptive fields. Optionally and preferably the technique does not require a learning process. The present inventors demonstrated the performance of the model on real images, and showed that the same model can predict a recent chromatic assimilation effect.

The technique of the present embodiments computes the perceived color in accordance with the response of retinal color coding ganglion cells. In some embodiments of the present invention this calculation involves two stages. The first stage evaluates the response of type I (LM, ML, on center cells) and type II (S/LM, coextensive cells) ganglion cells. This stage includes the calculation of the receptive field response of each color-coding cell, which also exhibits remote adaptation mechanism. The second stage of the model suggests a novel transformation of the ganglion cell response into a perceived image, as an inverse function. The retinal ganglion cells receive their input from the cones through several processing layers. The retinal ganglion cells perform an adaptation of the first order. The adaptation of the first order is modeled through adaptation of the cells' inputs rather than adaptation of its receptive field sub-regions. For example, the adapted ganglion cells' input signals can be calculated as follows:

$$L_{input\_adapted} = \frac{L_{photo-r}}{L_{photo-r} + \sigma_L}$$

$$M_{input\_adapted} = \frac{M_{photo-r}}{M_{photo-r} + \sigma_M}$$

$$S_{input\_adapted} = \frac{S_{photo-r}}{S_{photo-r} + \sigma_S}$$

Where L, M and $S_{photo-r}$ are the cones quantum catch, and $\sigma_{L,M,S}$ are remote and local adaptation signals which can be defined as:

$$\sigma_L = a \cdot L_{photo-r} + b + c \cdot L_{remote}$$

$$\sigma_L = a \cdot M_{photo-r} + b + c \cdot M_{remote}$$

$$\sigma_S = a \cdot S_{photo-r} + b + c \cdot S_{remote}$$

The remote signals are preferably defined as:

$$L_{remote}(x, y) = \iint_{cen-area} L_{photo-r}(x', y') \cdot f_{remote}(x-x', y-y') \cdot dx' \cdot dy'$$

$$M_{remote}(x, y) = \iint_{cen-area} M_{photo-r}(x', y') \cdot f_{remote}(x-x', y-y') \cdot dx' \cdot dy'$$

$$S_{remote}(x, y) = \iint_{cen-area} S_{photo-r}(x', y') \cdot f_{remote}(x-x', y-y') \cdot dx' \cdot dy'$$

The "remote" area is composed of an annulus-like shape around the entire RF region (see, for example, Spitzer H., Barkan Y, 2005, Computational adaptation model and its predictions for color induction of first and second orders. Vision Research, 45, 3323-3342). Its weight function (fremote) can be modeled as a decaying exponent at the remote area as following:

$$f_{remote}(x, y) = \frac{1}{\pi \cdot \rho_{remote}} \exp\left(-\frac{x^2 + y^2}{\rho_{remote}^2}\right); x, y \in \text{ remote\_area}$$

The spatial response profile of the two sub-regions of the retinal ganglion RF, "center" and "surround", is optionally and preferably expressed by the commonly used difference-of-Gaussians (DOG). The calculation of the DOG can be performed on the adapted inputs.

The "center" signals for two spectral regions, Lcen, Mcen, can be defined as an integral of the adapted inputs over the center sub-region, with a Gaussian decaying spatial weight function ($f_c$):

$$L^+M^-_{cen}(x, y) = \qquad\qquad\qquad\qquad\text{(EQ. A.1)}$$

$$\iint_{cen-area} L_{adapted}(x', y') \cdot f_c(x-x', y-y') \cdot dx' \cdot dy'$$

$$M^+L^-_{cen}(x, y) =$$

$$\iint_{cen-area} M_{adapted}(x', y') \cdot f_c(x-x', y-y') \cdot dx' \cdot dy'$$

$L^+M^-_{cen}(x, y)$ at each location represents the sub-region response of the center area, which is centered at location x, y. $f_c$ can be defined as:

$$f_c(x, y) = \frac{1}{\pi \cdot \rho_{cen}} \exp\left(-\frac{x^2 + y^2}{\rho_{cen}^2}\right); x, y \in \text{ center\_area} \qquad\text{(EQ. A.2)}$$

where ρ represents the radius of the center region of the receptive field. The 'Surround' signals can be similarly defined, with a spatial weight function three times larger than that of the 'center'.

$$L^+M^-_{sur}(x, y) = \qquad\qquad\qquad\qquad\text{(EQ. A.3)}$$

$$\iint_{sur-area} L_{adapted}(x', y') \cdot f_s(x-x', y-y') \cdot dx' \cdot dy'$$

$$M^+L^-_{sur}(x, y) =$$

$$\iint_{sur-area} M_{adapted}(x', y') \cdot f_s(x-x', y-y') \cdot dx' \cdot dy'$$

where $f_s$ is defined as a decaying Gaussian over the surround region:

$$f_s(x, y) = \frac{1}{\pi \cdot \rho_{sur}} \exp\left(-\frac{x^2 + y^2}{\rho_{sur}^2}\right); x, y \in \text{ surround\_area} \qquad\text{(EQ. A.4)}$$

In various exemplary embodiments of the invention the total weight of $f_c$ and $f_s$ is 1.

The response of the cells can be expressed by the subtraction of the center and surrounds responses, as follows:

$$L^+M^-(x,y) = L^+M^-_{cen}(x,y) - L^+M^-_{sur}(x,y)$$

$$M^+L^-(x,y) = M^+L^-_{cen}(x,y) - M^+L^-_{sur}(x,y)$$

The S/LM retinal color coding cell is referred to as the small-field bistratified ganglion cell. This cell's receptive field is known in the literature to be co-extensive (type II), wherein its opponency is mainly chromatic rather than spatial. Accordingly, the response of the S-cone opponent is modeled according to some embodiments of the present invention as a type II receptive field. The S/LM signal can therefore be calculated by integration of the chromatic difference (S/LM) over the whole receptive field of this cell type:

$$S^+LM^-(x, y) = \iint_{blue-RF-area} \left(S_{adapted}(x', y') - \frac{L_{adapted}(x', y') + M_{adapted}(x', y')}{2}\right) \cdot f_{s\_center}(x-x', y-y') \cdot dx' \cdot dy'$$

The spatial weight function of the receptive field, $f_{s\_center}$, can be similarly defined as in Eq. A2.

In various exemplary embodiments of the invention a functional minimization framework is employed to transform the opponent signals ($L^+M^-$, $M^+L^-$ and $S^+(L+M)^-$) into perceived triplet LMS values.

The perceived values can be calculated using the following equations:

$$L^+M^- = L_{per} - M_{surround\_per}$$

$$M^+L^- = M_{per} - L_{surround\_per}$$

$L_{surround\_per}$ and $M_{surround\_per}$ are defined as in Eq. A. 3, but on the perceived domain rather than adapted input signals.

The following error function can be defined:

$$E(L_{per}, M_{per}) = (L_{per} - (L^+M^- + M_{surround\_per}))^2 + (M_{per} - (M^+L^- + L_{surround\_per}))^2$$

This function is the square error of the estimation of $L_{per}$, $M_{per}$. This error function can be minimized by various methods. For example, a gradient descend method (CITE), can be used, e.g.:

$$\frac{\partial L_{per}}{\partial t} = -\frac{\partial E(L_{per}, M_{per})}{\partial L_{per}}$$

$$\frac{\partial M_{per}}{\partial t} = -\frac{\partial E(L_{per}, M_{per})}{\partial M_{per}}$$

Thus, the following iterative equations are obtained $$L_{per}^{i-1} = L_{per}^{i-1} + 2dt \cdot (A^{i-1} + f_s(0,0)B^{i-1})$$

$$M_{per}^{i-1} = M_{per}^{i-1} + 2dt \cdot (B^{i-1} + f_s(0,0)A^{i-1})$$

where $$A_{i-1} = L_{per}^{i-1} - L^+M^- - M_{surround\_per}^{i-1},$$

$$B^{i-1} = M_{per}^{i-1} - M^+L^- - L_{surround\_per}^{i-1},$$

and $f_s(0,0)$ is the value of the profile function for the surround region at (x,y)=(0,0). This iteration process provides the perceived L and M values, independently of the S-channel. The perceived S-channel value can be calculated after evaluating the L and M perceived values, using the following equation:

$$S_{per} = S^+(L+M)^- + (L_{per} + M_{per})/2$$

The present inventors used the above procedure for processing polychromatic images. In the image processing, the L, M and S color values of the original images were used as the $L_{photo-r}$, $M_{photo-r}$ and $S_{photo-r}$ values, and the calculated perceived values $L_{per}$, $M_{per}$ and $S_{per}$ colors were used as new colors values that were assigned to each pixel in the images.

The parameters used according to some embodiments of the present invention are described through a specific example. For clarity of presentation intermediate model results are presented. The same sets of parameters were used for all simulated images that are presented below. The inputs to the cones are simulated as sRGB triplet values.

At the first stage of the model, the adapted signals are calculated. The remote area was simulated as an annulus with a diameter of 35 pixels. The adaptation parameters were chosen as follows: a=1, c=1, representing equal strength for the local and remote adaptations. The parameter b, which determines the strength of adaptation (see, e.g., Spitzer & Barkan 2005), was taken as b=3.

The surround signals were calculated with $f_s$ having a decay constant ρ of 3 pixels. The response of the RF's was obtained by the subtraction of the center and surround adapted responses.

FIGS. 4A-C demonstrate the model response of the three different color coding receptive fields, where FIG. 4A corresponds to the $L^+M^-$ response, FIG. 4B corresponds to the $M^+L^-$ responses, and FIG. C corresponds to the $S^+(L+M)^-$.

In FIG. 4A ($L^+M^-$ responses) the green rings of the stimuli are coded as negative values (dark rings), representing the higher M than L values within these rings. Similarly, the magenta rings are coded as positive values (brighter rings). The test ring (central rings) is also coded by positive values, and yields the same values in both left and right ring stimuli (about 0.07). The $M^+L^-$ responses (FIG. 4B) are similar to those of the $L^+M^-$ responses, but with inverted sign. The $S^+(L+M)^-$ RF response (FIG. 4C) is blurred due to the higher spatial size of the RF. Consequently, the test ring is coded differently in the left and right ring stimuli. In the left ring stimulus, the test ring (which is adjacent to the green ring), is coded with lower value (darker ring in FIG. 4C) than the test ring within the right ring stimulus (which is adjacent to magenta ring). The different responses to the same physical test ring, but still with different chromatic context, are the genesis/origin of what is perceived as the assimilation effect.

The transformation from the RF responses to a perceived image was performed using Jacobi iterative method. The iteration process was initiated by assuming achromatic stimuli. Specifically all channels where initiated with the following values:

$$L_{per}^0 = M_{per}^0 = S_{per}^0 = \frac{L_{adapted} + M_{adapted}}{2}$$

FIGS. 5A-C demonstrates the iterative process that computes the perceived values, for iteration Nos. 1, 10 and 100, respectively. The iterative process converges to the predicted perceived image while the color fills-in the stimulus.

The results of the technique of the present embodiments are presented below for both artificial and natural images.

The performances have been done on images that were computationally simulated to obtain strong LCA by defocusing the blue channel. Without wishing to be bound to any theory it is suggested that there is a linkage between the neuronal mechanism that aimed to compensate for LCA, and specific visual phenomena which can be derived from the very same neuronal mechanism. The results are therefore presented to show predictions of the technique of the present embodiments for the chromatic assimilation effect. All simulations were computed with the same parameters described above.

Figure 6A:
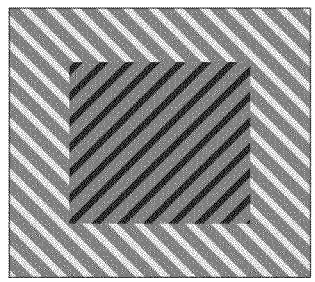
Figure 6B:
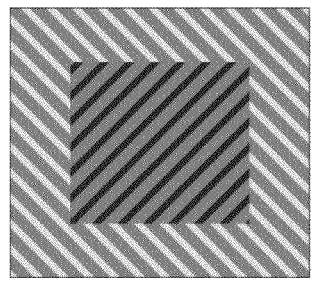
Figure 6C:
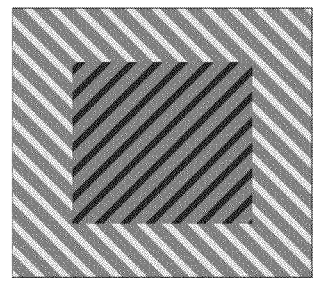
Figure 6D:
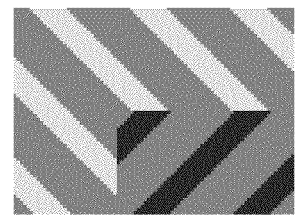
Figure 6E:
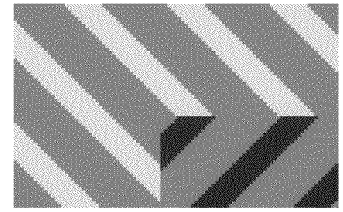
Figure 6F:
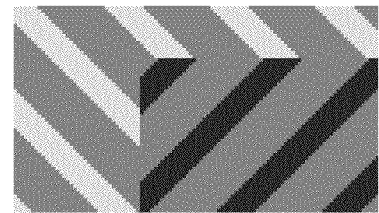

FIGS. 6A-F demonstrate the model performance on artificial synthetic achromatic grid composed of equal energy of three chromatic channels (Red, Greed and Blue) that represent the three chromatic cones (L, M and S). FIGS. 6D-F are respective magnified versions of portions of the images shown in FIGS. 6A-C.

FIGS. 6A and 6D show the original grid, and FIGS. 6B and 6E show the grid with simulated longitudinal chromatic aberration. In the aberration, the blue channel of the achromatic grid was blurred. As shown, the blurred blue channel, causes chromatic distortions adjacently to borders. The distortion appears yellowish (lack of blue) on the brighter side of the border and bluish on the darker side. FIGS. 6C and 6F show the artificial synthetic achromatic grid after the simulated LCA has been corrected in accordance with some embodiments of the present invention. As shown, the model of the present embodiments succeeds to reduce significantly the chromatic-border distortion.

FIGS. 7A-C demonstrate the performance of the technique of the present embodiments on along a horizontal line passing across the images of FIGS. 6A-C.

FIG. 7A is a graph of the responses on the simulated aberration image of FIGS. 6B and 6E. The green line shows the (L+M)/2 response, and the blue line shows the S response. Due to the aberration, the S response does not have sharp edges and appears as a low-pass version of the (L+M)/2 response.

FIG. 7B is a graph of the same responses on the corrected images (FIGS. 6C and 6F). As shown, the S channel is successfully corrected by the technique of the present embodiments.

FIG. 7C is a graph of the chromatic contrast defined as the ratio of the blue channel value to the combined red and green channel value (blue/(red+green)). The chromatic contrast is plotted for the simulated aberration (blue) and the corrected image (red). The chromatic contrast can represent the chromatic deviation from neutral hue (achromatic region). An achromatic region has a chromatic-contrast value equals to 1, with higher values corresponding to deviation towards bluish chroma, and lower values corresponding to yellowish chroma. FIG. 7C shows that the deviation from white is significantly reduced by the technique of the present embodiments. It is demonstrated with a small magnitude of the red plot in comparison to the blue plot.

The present inventors further tested the model's ability to compensate for LCA on images captured from a scene. Since the distorted colors in photographic chromatic aberrated images are dependent on the specific optics of the acquiring camera, the aberrations were simulated also for images captured from a scene.

FIG. 8A shows the captured image (left), the simulated aberrations (middle), and the image after the correction of the simulated aberrations (right). FIG. 8B respectively shows a magnified version of the face portion shown in the left, middle and right panels of FIG. 8A, and FIG. 8C respectively shows a magnified version of the neck portion shown in the left, middle and right panels of FIG. 8A.

The technique of the present embodiments successfully corrected the chromatic distortions around borders (FIGS. 8A-C, right). A prominent result was obtained in the distorted eye color (FIG. 8B, right) and the distorted shirt color (FIG. 8C, right). Some minor chromatic artifacts were observed in the skin color around the hair (FIG. 8C, middle).

The procedure of the present embodiments limits the spatial frequency of the Blue-Yellow channel. Such a procedure can lead to chromatic illusions that are related to stimuli having high frequencies of blue/yellow chromaticity. The present embodiments contemplate preservation of such illusions since this mimics the perception of colors in the human visual system. Some embodiments also provide a blue-yellow assimilation effect among adjacent chromatic regions. The present embodiments contemplate preservation of such effect since this also mimics the perception of colors in the human visual system.

A chromatic illusion can occur when a chromatic narrow ring is perceived with completely different color depending on the adjacent color adjacent to the ring. This effect is illustrated in FIGS. 9A-C which demonstrate the ability of the technique of the present embodiments to preserve an enigmatic psychophysical effect known as "chromatic shifts by S-cone pattern" (see, e.g., Steven and Monnier, Visual Neuroscience, 23(3-4):567-571, 2006). FIG. 9A is an image which demonstrates the effect. The prominent perceived ring colors at the left and right sides of FIG. 9A are consisted from the same hue as presented on the orange square. It perceived differently due to the adjacent colored ring which is different at the two circles. FIG. 9B is an image, processed according to some embodiments of the present invention. As shown, the technique of the present embodiments successfully preserves the effect. FIG. 9C shows magnified versions of the images in FIGS. 9A and 9B, where the leftmost image in FIG. 9C corresponds to the left image of FIG. 9A, the second image from left in FIG. 9C corresponds to the right image of FIG. 9A, the second image from right in FIG. 9C corresponds to the left image of FIG. 9B, and the rightmost image in FIG. 9C corresponds to the right image of FIG. 9B.

The present inventors found that the chromatic shift is not dependant directly to the amount of blue of the adjacent rings. Rather, it is dependent on the relative amount of blue and yellow in the adjacent rings. The technique of the present embodiments shows the trend of the perceived chromaticity shift toward the chromaticity of the adjacent ring. The predicted shift between the two chromaticities in terms of chromatic contrast (S/(L+M)) is about 0.31 which is in the range found psychophysically.

The present example demonstrated a neuronal mechanism and a computational model, which are based on retinal chromatic receptive fields that perform compensation for longitudinal chromatic aberrations (LCA). The technique of the present embodiments succeeds to reduce significantly the chromatic distortion at both artificial and natural images. The present example also showed that the suggested neuronal compensation mechanism causes an artifact of chromatic assimilation, which corresponds to the chromatic assimilation phenomenon. The prediction of a psychophysical visual phenomenon, as an artifact of the suggested chromatic aberration compensation mechanism, presents a solid support to the validity of the suggested computational model for LCA compensation.

The neuronal mechanism discovered by the present inventors is based on the spatial and chromatic structure of the blue-yellow channel (S/L+M) receptive fields, which are spatially coextensive. This type of receptive fields are also known as "type II" and are referred to the small bistrafied cells (SBC). This spatial coextensively structure, is unique to the RF of S/(L+M) channel, whereas the other chromatic receptive fields have mostly spatial and chromatic opponent structure. The type II receptive fields were incorporated according to some embodiments of the present invention into an image processing method and system. The present inventors developed an inverse function that enables a transformation from receptive field response to perceived values. This enables the evaluation of the model in the image domain, rather than on receptive field responses.

Although the ocular lens is tuned to the most important wavelengths (generally yellowish), it still suffers from the consequences of the chromatic aberration. The neural system compensates some of these optical imperfections. Without wishing to be bound to any particular theory, the present inventors suggest that the visual mechanism utilizes the absence of sharp blue-yellow edges to diminish the effect of chromatic distortions. This is performed by the following mechanisms, which are supported by psychophysics and neurophysiologic findings.

The luminance information (in the photopic condition) is obtained mainly from the L and M channels, which suffer less from LCA. This finding of the present inventors is supported by psychophysical evidence that show that the contribution of the S cone to luminance perception is negligible or null.

The opponent receptive field structure of the S-channels is both spatially coextensive and chromatically complementary. This RF performs a blur of the blue-yellow information, which their chromatic mixture yields an achromatic color. Such a spatio-chromatic structure (of S/(L+M) RF) yields a null response to achromatic edges, also in the presence of LCA affecting the S channel. This spatio-chromatic property was exploited by the present inventors to reduce or minimize the chromatic distortion.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of processing a polychromatic image arranged gridwise in a plurality of picture elements each represented by a color spectrum resolvable into a plurality of individual colors over the grid, the method comprising, for each of at least a portion of said picture elements, using an image processor for assigning to said picture element a new color value for each individual color, and storing said new values in a computer readable medium, wherein said assigning comprises:
   processing each of a first and a second colors of said picture element, based, at least in part on first and second colors of picture elements being peripheral to said picture element, to respectively provide a first processed color value and a second processed color value;
   employing an optimization procedure for reducing an error of said processed color values, and for assigning to said picture element a new color value for each of said first and said second colors; and
   assigning to said picture element a new color value for a third color calculated based, at least in part, on said new color values for said first and said second colors;
   wherein said processing comprises:
   obtaining a first central value and a second central value, respectfully corresponding to said first and said second colors;
   calculating a first peripheral value and a second peripheral value, respectfully corresponding to said first and said second colors;
   subtracting said second peripheral value from said first central value, thereby providing said first processed value; and
   subtracting said first peripheral value from said second central value, thereby providing said second processed value.

2. The method of claim 1, wherein said first central value and said second central values are respective color values of said picture-element.

3. The method of claim 1, further comprising calculating said first central value and said second central values, by integrating respective color values over picture-elements other than said peripheral picture-element and being nearby said picture-element.

4. The method of claim 1, wherein said optimization procedure comprises a gradient descend procedure.

5. The method of claim 1, wherein said optimization procedure comprises at least one procedure selected from the group consisting of implex, convex minimization, neural networks, Bayesian networks, support vector machine, linear programming, nonlinear programming, Hessian procedure, entropy optimization, and simulated annealing.

6. The method of claim 1, wherein said new color value for the third color is calculated using an average of said new color for said first color and said new color for said second color.

7. The method of claim 6, wherein said calculation of said third color further comprises:
   obtaining a third central value corresponding to said third color;
   subtracting from said third central value an average between said first central value and said second central value.

8. The method of claim 1, wherein said image is a still image.

9. The method of claim 1, wherein said image is a frame of a video stream, and the method is repeated for each frame of said video stream.

10. Apparatus for processing a polychromatic image arranged gridwise in a plurality of picture elements each represented by a color spectrum resolvable into a plurality of individual colors over the grid, the apparatus comprising, an image processor configured for assigning to said picture element a new color value for each individual color, and storing said new values in a computer readable medium, wherein said image processor comprises a circuit configured for:
   processing each of a first and a second colors of said picture element, based, at least in part on first and second colors of picture elements being peripheral to said picture element, to respectively provide a first processed color value and a second processed color value;
   employing an optimization procedure for reducing an error of said processed color values, and for assigning to said picture element a new color value for each of said first and said second colors; and
   assigning to said picture element a new color value for a third color calculated based, at least in part, on said new color values for said first and said second colors;
   wherein said circuit is further configured for:
   obtaining a first central value and a second central value, respectfully corresponding to said first and said second colors;
   calculating a first peripheral value and a second peripheral value, respectfully corresponding to said first and said second colors;
   subtracting said second peripheral value from said first central value, thereby providing said first processed value; and subtracting said first peripheral value from said second central value, thereby providing said second processed value.

11. The apparatus of claim 10, wherein said first central value and said second central values are respective color values of said picture-element.

12. The apparatus of claim 10, wherein said circuit is configured for calculating said first central value and said second central values, by integrating respective color values over picture-elements other than said peripheral picture-element and being nearby said picture-element.

13. The apparatus of claim 10, wherein said optimization procedure comprises a gradient descend procedure.

14. The apparatus of claim 10, wherein said optimization procedure comprises at least one procedure selected from the group consisting of implex, convex minimization, neural networks, Bayesian networks, support vector machine, linear programming, nonlinear programming, Hessian procedure, entropy optimization, and simulated annealing.

15. The apparatus of claim 10, wherein said new color value for the third color is calculated using an average of said new color for said first color and said new color for said second color.

16. The apparatus of claim 15, wherein said circuit is configured for:
obtaining a third central value corresponding to said third color;
subtracting from said third central value an average between said first central value and said second central value.

17. A camera system, comprising an image capturing apparatus for capturing a polychromatic image, and an apparatus for processing the polychromatic image, wherein said apparatus for processing the polychromatic image comprises the apparatus of claim 10.

18. The system of claim 17, wherein said circuit of said apparatus for processing said polychromatic image is an integrated circuit mounted in said image capturing apparatus.

19. A method of processing a polychromatic image arranged gridwise in a plurality of picture elements each represented by a color spectrum resolvable into a plurality of individual color over the grid, the method comprising, for each of at least a portion of said picture elements, using an image processor for assigning to said picture element a new color value for each individual color and storing said new vales in a computer readable medium, wherein said assigning comprises:
processing each of a first and a second colors of said picture element, based, at least in part on first and second colors of picture elements being peripheral to said picture element, to respectively provide a first processed color value and a second processed color value;
employing and optimization procedure for reducing an error of said processed color values, and for assigning to said picture element a new color vale for each of said first and said second colors; and
assigning to said picture element a new color value for third color calculated using and average of said new color for said first color and said new color for said second color.

20. The method of claim 19, wherein said calculation of said third color further comprises:
obtaining a third central value corresponding to said third color;
subtracting from said third central value and average between said first central value and said second central value.

21. The method of claim 19, further comprising calculating said first central value and said second central values, by integrating respective color values over picture-elements other than said peripheral picture-element and being nearby said picture-element.

22. The method of claim 19, wherein said optimization procedure comprises a gradient descend procedure.

23. The method of claim 19, wherein said optimization procedure comprise at least one procedure selected from the group consisting of implex, convex minimization, neural networks, Bayesian network, support vector machine, linear programming, nonlinear programming, Hessian procedure, entropy optimization, and simulated annealing.

24. The method of claim 19, wherein said image is a still image.

25. The method of claim 19, wherein said image is a frame of a video stream, and the method is repeated for each frame of said video stream.

26. Apparatus for processing a polychromatic image arranged gridwise in a plurality of picture elements each represented by a color spectrum resolvable into a plurality of individual colors over the grid, the apparatus comprising, an image processor configured for assigning to said picture element a new color value for each individual color, and storing said new values in a computer readable medium, wherein said image processor comprises a circuit configured for:
processing each of a first and a second colors of said picture element, based, at least in part on first and second colors of picture elements being peripheral to said picture element, to respectively provide a first processed color value and a second processed color value;
employing an optimization procedure for reducing an error of said processed color values, and for assigning to said picture element a new color value for each of said first and said second colors; and
assigning to said picture element a new color value for a third color calculated using an average of said new color for said first color and said new color for said second color.

27. The apparatus of claim 26, wherein said circuit is configured for:
obtaining a third central value corresponding to said third color;
subtracting from said third central value an average between said first central value and said second central value.

28. The apparatus of claim 26, wherein said circuit is configured for calculating said first central value and said second central values, by integrating respective color values over picture-elements other than said peripheral picture-element and being nearby said picture-element.

29. The apparatus of claim 26, wherein said optimization procedure comprises a gradient descend procedure.

30. The apparatus of claim 26, wherein said optimization procedure comprises at least one procedure selected from the group consisting of implex, convex minimization, neural networks, Bayesian networks, support vector machine, linear programming, nonlinear programming, Hessian procedure, entropy optimization, and simulated annealing.

31. A camera system, comprising an image capturing apparatus for capturing a polychromatic image, and an apparatus for processing the polychromatic image, wherein said apparatus for processing the polychromatic image comprises the apparatus of claim 26.

32. The system of claim 31, wherein said circuit of said apparatus for processing said polychromatic image is an integrated circuit mounted in said image capturing apparatus.

* * * * *